Jan. 12, 1932.   M. HANDSCHIEGL   1,840,669
PROCESS OF MAKING DOUBLE EXPOSURES
Filed Jan. 2, 1923
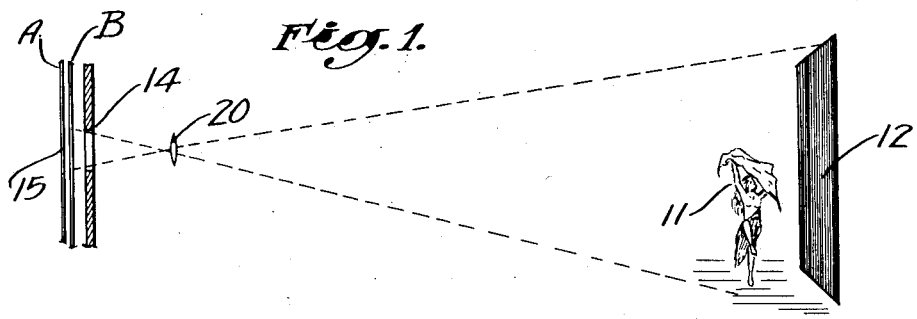
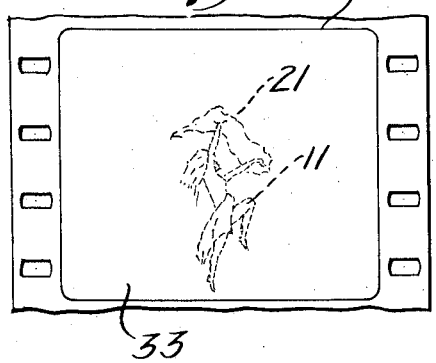
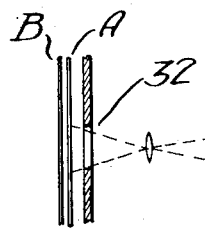
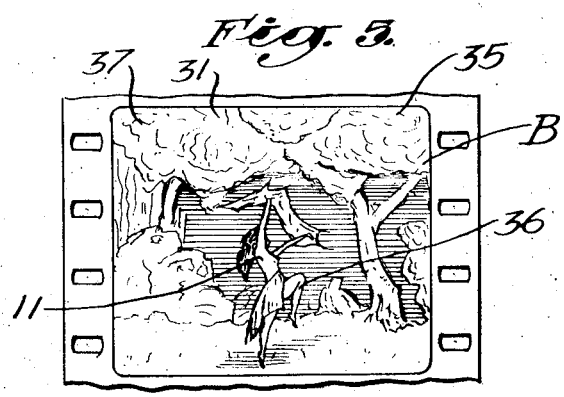
INVENTOR:
MAX HANDSCHIEGL,
BY
 Graham Harris
ATTORNEYS Patented Jan. 12, 1932

1,840,669

UNITED STATES PATENT OFFICE

MAX HANDSCHIEGL, OF LOS ANGELES, CALIFORNIA

PROCESS OF MAKING DOUBLE EXPOSURES

Application filed January 2, 1923. Serial No. 610,334.

My invention relates to the art of making motion pictures, and relates particularly to a process employed in making double exposed films.

It is often desirable in the production of a motion picture to combine several actions upon one film; in other words, it is desirable to photograph a figure or subject which constitutes one action, and to then photograph upon the same film a scene or other similar action at another place, making it appear in the final production that both actions occurred simultaneously or that the action part shown was taken with certain scenery or background.

It is an object of my invention to provide a means whereby a figure or an object may be photographed in one location and the partly exposed film taken to another location and a scene or other action photographed upon the same negative, thus making the two light impressions which the film has received cooperative and non-interfering in their effect.

It is a further object of the invention to provide such a process which will be of greater economy than those processes now employed, and by which the separate actions may be made to accurately register so that hazy effects and poorly defined outlines are eliminated.

The advantages of my invention and further objects thereof will be made evident hereinafter.

Referring to the drawings, which are for illustrative purposes only,

Fig. 1 is a diagrammatic view showing the manner in which a figure or action is photographed upon a pair of negative films.

Figs. 2 and 3 are enlarged views of cooperating frames of the two films, only the latter being shown as developed.

Fig. 4 is a diagrammatic view showing the manner in which a scene may be photographed upon the sensitized film carrying an undeveloped image.

Fig. 5 is a view of a positive print from the film shown in Fig. 2 after this film has received the photographic image of the scene.

In the practice of my invention, I employ, as shown in Fig. 1, a pair of negative films A and B. These films A and B are placed in a suitable camera and the photographic image of a figure 11, in action before a black curtain 12, is light impressed upon both films. It is necessary that the photographic image of the figure be impressed upon the two films A and B in exactly the same position. This may be accomplished with double camera arrangements, but I prefer in the practice of my invention to employ a single lens camera as indicated at 14 and to run the films together, one placed upon the other as shown at 15. In this manner, the light impression of the image passes through the film B and is received by the film A, an exact duplication and registering of the light impressions being thereupon obtained.

In Fig. 1 and the following views, I illustrate this double-exposure work. Let it be supposed that in a certain motion picture production a wood nymph dancing scene is desired. It is not always possible or practical to take the action directly upon the location of the scene and therefore the nymph as indicated at 11 must be photographed upon the film at one time and the scene or background subsequently photographed at a different location. A black velvet curtain, as indicated at 12, reflects no actinic rays and therefore the figure 11 only is light impressed upon the sensitized films A and B, the area surrounding the image being non-exposed and therefore in its original sensitized condition. One of the films is then developed. It is preferable to develop the film A, which was originally placed behind the film B, as the light rays are received directly through the lens 20 by the sensitized emulsion surface of the film B, thus giving a very clear outline to B, while the light impression in passing through the negative film B may lose a portion of its distinctness.

As shown in Fig. 2, the figure 11 is light impressed upon the sensitized film B as indicated by the dotted lines 21. The developed film A shown in Fig. 3 after receiving substantially the same light impression as shown in Fig. 2, is developed in contrast, as shown at 22 in Fig. 3. By contrast is meant the development of the image so that it will receive a very heavy deposit of silver and will stand out from the surrounding area 23 and will be of pronounced opacity which will interfere with the passage of light rays through the film portions upon which the image 22 is photographed, but will permit the free passage of light through the surrounding area 23.

It is understood that the film B up to the present time has remained undeveloped and that the entire emulsion surface thereof is still in a sensitized condition. The next step in the process is to place the developed film A upon the undeveloped film B, in which positions the light impressed image indicated by dotted lines 21 in Fig. 2 will be entirely covered by the contrast developed image 22 upon the film A. These films are then placed in a camera as shown in Fig. 4 with the developed film A in front of the undeveloped film B and the desired scene or other action is photographed upon the film B through the clear area 23 which surrounds the developed image 22. Since the developed image 22 of the film A will not permit the passage of light and since the two films A and B were simultaneously light impressed with the image of the figure 11, the image 22 will exactly register with the undeveloped image 21 and therefore prevent any further exposure of the image 21 in the camera.

The scene which is to be employed as a background for the action 11 may be an actual scene taken on location in a forest or may be a picture, such as an oil painting or print. In Fig. 4, for the purpose of simplicity in illustrating the invention, I show a picture 30 having a scene 31 represented thereupon. The camera 32 is focused upon the picture and the image of the scene 31 is light impressed upon the area 33 of the undeveloped film B, which area surrounds the image 21 of the figure 11. The films A and B are then removed from the camera and the film B developed. The resultant film will contain the image of the action of the figure 11 shown in Fig. 1 and will also contain the image of the scene 31 depicted on the picture 30 in Fig. 4. Therefore a positive frame printed from the developed negative, as shown at 35 in Fig. 5, will have a positive image 36 thereupon appearing in action before a positive image 37 of the scene 31, with the result that when the final positive film is projected the figure 11 will appear in action before the background 31, thus accomplishing the desired representation of a wood nymph dance. The background or scene which is employed may be photographed, as hereinbefore described, from a picture, or the scene may be impressed upon the film B from a previously taken positive of a scene or action, this impression being accomplished either in a projection printer or contact printer.

I claim as my invention:

1. In a process for producing double exposed film, steps which include: light impressing a pair of films with an image of an action, the background used being such as to produce no undesired light effects; developing one of these films to bring out the image; placing said developed film in front of said undeveloped film; and then light impressing another image, upon said undeveloped film, through said developed film.

2. In a process for producing double exposed film, steps which include: light impressing a pair of films with an image of an action, the background used being such as to produce no undesired light effects; developing one of these films to bring out the image in contrast; placing said developed film in front of said undeveloped film; and then light impressing another image, upon said undeveloped film, through said developed film.

3. In a process for producing double exposed film, steps which include: light impressing a pair of films with an image of an action, the background used being such as to produce no undesired light effects; developing one of these films to bring out the image; placing said developed film in front of said undeveloped film; and then light impressing another image, upon said undeveloped film, through the transparent portions of said developed film.

4. In a process for producing double exposed film, steps which include: placing a pair of unexposed films in a camera; light impressing an image of an action upon said films, the background used being such as to produce no undesired light effects; developing one of said films to bring out the image; placing said developed film before said undeveloped image in a camera; and then light impressing another image upon said undeveloped film, through said developed film.

5. In a process for producing double exposed film, steps which include: placing a pair of unexposed films in a camera, one upon the other; light impressing an image of an action upon said films, the background using being such as to produce no undesired light effects; developing one of said films to bring out the image; placing said developed film before said undeveloped image in a camera; and then light impressing another image upon said undeveloped film, through said developed film.

6. In a process for producing double exposed film, steps which include: placing a pair of unexposed films in a camera, one upon the other; light impressing an image of an action upon said films, the background used being such as to produce no undesired light effects; developing one of said films to bring out the image in contrast; placing said developed film before said undeveloped image in a camera; and then light impressing another image upon said undeveloped film, through said developed film.

7. In a process for producing double exposed film, the steps which include: placing a pair of unexposed films in a camera, one upon the other; light impressing upon said film an image of an action before a background which will not produce undesirable light effects; developing one of said films to bring out the image in contrast; placing said developed film before said undeveloped image in a camera; and then light impressing another image upon said undeveloped film, through the transparent portions of said developed film.

8. In a process for producing double exposed film, the steps which include: light impressing a pair of films with an image of an action before a non-actinic background; developing one of these films to bring out the image; placing said developed film in front of said undeveloped image in a camera; and then light impressing another image upon said undeveloped film, through said developed film.

9. In a process for producing double exposed film, steps which include: light impressing a pair of films with an image of an action before a black background; developing one of these films to bring out the image; placing said developed film in front of said undeveloped film in a camera; and then light impressing another image upon said undeveloped film, through said developed film.

10. In a process for producing double exposed film, the steps which include: placing a pair of unexposed films in a camera; light impressing an image of an action before a black background upon said films; developing one of said films to bring out the image; placing said developed film before said undeveloped film in a camera; and then light impressing another image upon said undeveloped film, through the transparent portions of said developed film.

11. In a process for producing double exposed film, the steps which include: placing a pair of unexposed films in a camera; light impressing an image of an action before a black background upon said films; developing one of said films to bring out the image; placing said developed film before said undeveloped film in a camera; and then light impressing another image upon said undeveloped film, through said developed film.

12. The herein described photographic method of producing composite pictures, which consists in photographing upon two strips of sensitized film a component object against a black background to produce a pair of matched photographed impressions, treating one of said strips to produce a silhouette of said component object thereon, projecting a supplemental object on the other strip of raw film through said silhouette film, whereby the photographed impression is masked and the supplemental object is photographed on the raw film.

In testimony whereof, I have hereunto set my hand at Los Angeles, California, this 23rd day of December, 1922.

MAX HANDSCHIEGL.